MATRIX SELECTION CIRCUIT WITH BIAS MEANS FOR NONSELECTED CIRCUITS IN ONE SET OF MATRIX COORDINATE DRIVE CIRCUITS

Filed Dec. 3, 1962 6 Sheets-Sheet 1

INVENTORS C. G. CORBELLA
P. A. HARDING
E. H. SIEGEL JR.

BY Charles Scott Phelan
ATTORNEY

MATRIX SELECTION CIRCUIT WITH BIAS MEANS FOR NONSELECTED CIRCUITS IN ONE SET OF MATRIX COORDINATE DRIVE CIRCUITS

Filed Dec. 3, 1962 6 Sheets-Sheet 2

Sept. 7, 1965 C. G. CORBELLA ETAL 3,205,481

MATRIX SELECTION CIRCUIT WITH BIAS MEANS FOR NONSELECTED CIRCUITS IN ONE SET OF MATRIX COORDINATE DRIVE CIRCUITS

Filed Dec. 3, 1962 6 Sheets-Sheet 3

MATRIX SELECTION CIRCUIT WITH BIAS MEANS FOR NONSELECTED CIRCUITS IN ONE SET OF MATRIX COORDINATE DRIVE CIRCUITS

Filed Dec. 3, 1962 6 Sheets-Sheet 5

United States Patent Office 3,205,481

Patented Sept. 7, 1965

3,205,481

MATRIX SELECTION CIRCUIT WITH BIAS MEANS FOR NONSELECTED CIRCUITS IN ONE SET OF MATRIX COORDINATE DRIVE CIRCUITS

Carlo G. Corbella, Red Bank, Philip A. Harding, Middletown, and Eugene H. Siegel, Jr., Middletown Township, Monmouth County, N.J., assignors to Bell Telephone Laboratories, Incorporated, New York, N.Y., a corporation of New York Filed Dec. 3, 1962, Ser. No. 241,736

12 Claims. (Cl. 340—166)

This invention relates to matrix switching circuits, and more particularly it relates to an arrangement for biasing matrix switching circuits such as are employed, for example, as access circuits in magnetic memory systems.

It is well known that a plurality of electric circuit loads can be connected for selective actuation in a matrix of interconnected row and column circuits. Selection of a particular load is accomplished by activating a row circuit and a column circuit which are connected to one another by the desired load. The copending patent application Serial No. 81,433 which was filed January 9, 1961, under the name of P. A. Harding, discloses, among other things, the concept of employing sucessively smaller access matrices for selecting rows and columns of a random access magnetic memory array. In the specific example disclosed in that application, a seconday access matrix has as the circuit load of each matrix crosspoint a drive lead for a row of a coordinate magnetic memory array. The crosspoints in each row of the secondary access matrix are driven through a read bus and a write bus which are coupled to each crosspoint load of the row by a different pair of oppositely poled diodes. Each of the loads in each column of the secondary access matrix is connected to a colum wire which is common to all crosspoints of the column. Each of the column wires is also connected by a different pair of oppositely poled diodes to a read return bus and a write return bus, respectively, which are common to all columns of the matrix. With this arrangement, drive pulses of different polarities may be used in the read and write circuits, respectively, without interference with one another, and at the same time a single column wire may be employed which is common to both the read and the write circuits of all rows to which the column is connected.

It has been found that spurious capacitances couple the various crosspoint loads of the secondary access matrix to one another. When a row of the matrix is selected to be driven, all of the spurious capacitances associated with crosspoint loads coupled thereto must be charged before the drive signal can attain the desired drive amplitude. The time required for charging these capacitances with the drive current must be added to the cycle time of the memory and forces a slower speed of operation than would be possible in the absence of such capacitances. Furthermore, the precharging of these spurious capacitances represents a nonproductive drain on the drive current source; and signals coupled by such capacitances to nonselected crosspoint loads hamper proper memory operation by decreasing the signal-to-noise ratio of the memory array read-out signal.

It is therefore one object of the invention to reduce the drive current requirement for magnetic memory systems.

Another object is to reduce the dissipative effects of spurious capacitances interconnecting crosspoint loads of a switching matrix.

A further object is to increase the operating speed of a switching matrix.

These and other objects of the invention are realized in one illustrative embodiment thereof by providing circuit means which precharge the spurious capacitances coupled to nonselected column circuits of a selection matrix just prior to the read and write intervals of the memory system so that the diodes which couple the nonselected columns to a selected row circuit are reversely biased with respect to the drive signals and thereby isolate the non-selected column circuits from the selected row circuit.

It is one feature of the invention that memory system clock signals which are provided during write intervals of the memory are utilized in combination with matrix column selection signals provided from the memory program control to operate AND-NOT logic for appropriately biasing the nonselected column wires to achieve the aforementioned biasing and precharging functions.

It is another feature of the invention that the charge placed on the spurious capacitances associated with nonselected columns by the precharge signals is of correct polarity for reversely biasing row diodes connected thereto.

It is still another feature that the same AND-NOT logic circuit which provides the precharge currents automatically reverses the charge polarity on the spurious capacitances between the read and write intervals of the memory to produce the same precharge effect during each of those intervals even though the drive currents applied to the respective read and write buses of the selected matrix row are of opposite polarity with respect to one another.

Yet another feature of precharge circuits in accordance with the invention is that such circuits permit drive current economies that were heretofore unattainable. Larger drive currents can be employed without increased leakage. A given drive current can operate a larger memory array because the reduction of leakage enables the current to operate more magnetic devices so that the array can include more bits per word and more words.

It is still another feature that each of the column logic circuits includes a diode which is so connected that it grounds the corresponding column wire in response to a program control signal which selects that column for operation.

An additional feature of the invention is that each column of the memory selection matrix has its own individual AND-NOT logic circuit with two input connections for receiving clock and program signals, and each such logic circuit produces on a single output connection one of three different voltage conditions depending upon the particular permutation of input signal conditions.

A complete understanding of the invention and the various objects and features thereof may be obtained from the following detailed description and the appended claims when considered together with the attached drawings in which:

Figure 1:
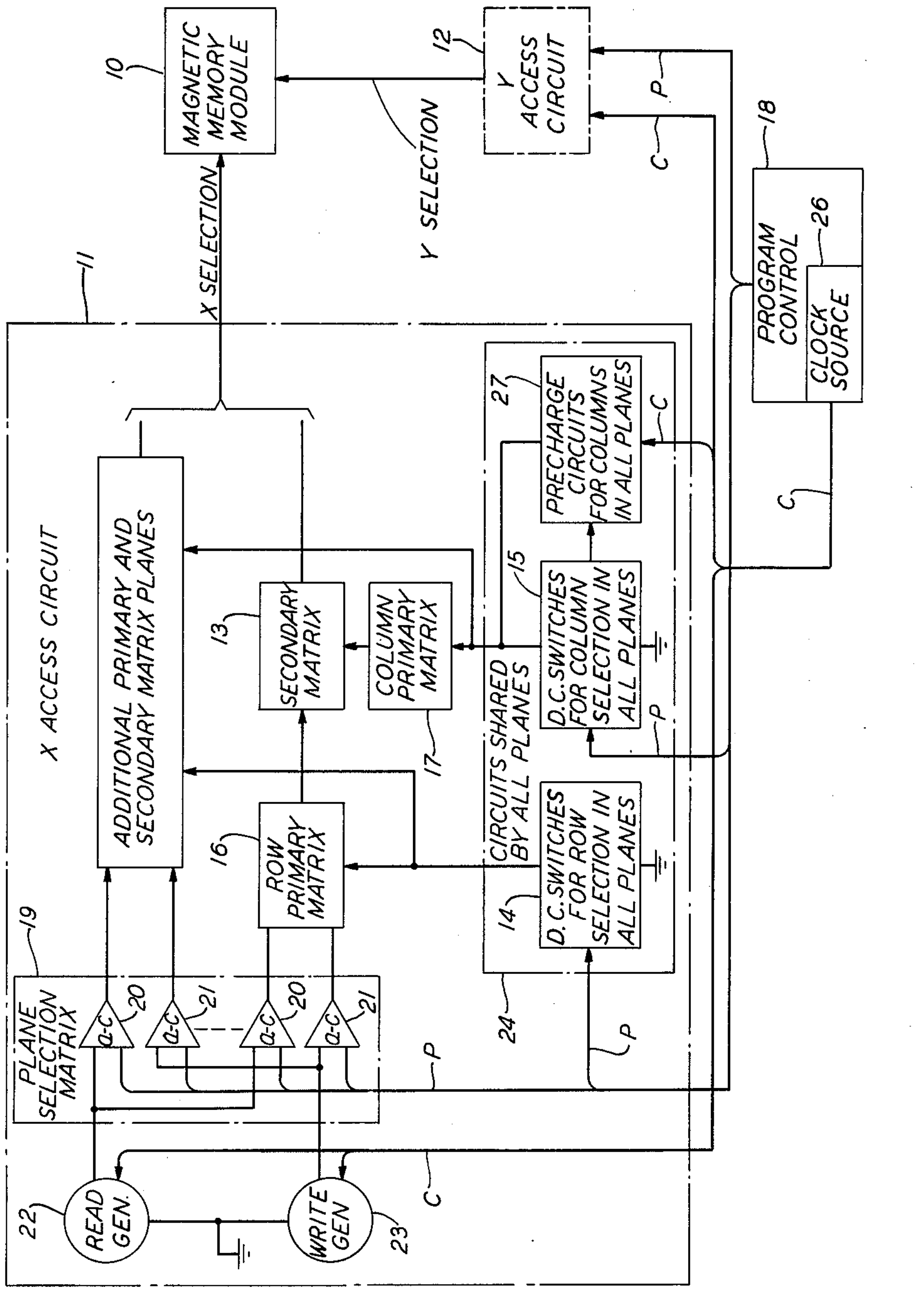
FIG. 1 is a block and line diagram of a magnetic memory system employing the present invention.

In FIG. 1 there is shown a magnetic memory array of the random access variety such as may be usefullly employed in electronic switching systems for temporary storage of information in telephone central offices. A magnetic memory module 10 of any suitable type employs a plurality of storage devices which may be selected for actuation to read out information stored therein, or to write information therein, by the simultaneous actuation of a selected X coordinate drive circuit and a selected Y coordinate drive circuit. The selection of X and Y circuits to drive module 10 is accomplished by an X access circuit 11 and a Y access circuit 12. These access circuits are substantially the same in structure; and it will be sufficient, therefore, to describe only one of them. This type of access circuit is described in detail in the aforementioned copending Harding application in connection with a two-dimensional access system. The principles of the two-dimensional access are herein applied to a three-dimensional access system and described in only sufficient detail to present a clear picture of the operation of the novel improvement therein which is the subject of the present invention.

Within access circuit 11, a secondary matrix 13 has crosspoints arranged in rows, columns, and planes so that the product of the numbers of rows, columns, and planes is at least equal to the number of X input circuits of the memory module 10. For each plane of matrix 13, a row primary matrix 16 and a column primary matrix 17 are provided for cooperating with common row and column selection switches 14 and 15 to select a particular row and column of the plane under the control of program signals received on a circuit P from a program control 18 for the memory array. Details of this cooperative function and all units of common circuits 24 will be discussed in connection with FIGS. 2A and 2B. The circuit P is shown as a line in FIG. 1 and, of course, schematically represents a plurality of program leads cabled together and individually dropped out at the appropriate circuit points.

Figure 7:
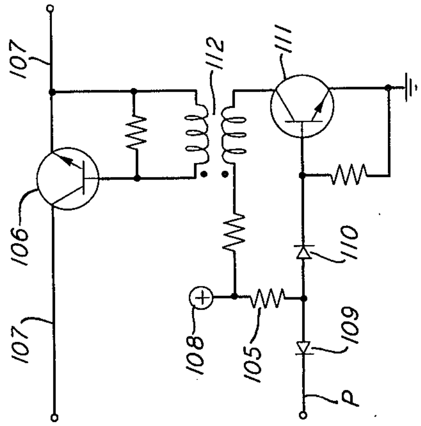

A plane primary selection matrix 19 is also provided for selecting for actuation the primary matrix 16 associated with a desired plane of secondary matrix 13. Matrix 19 includes a different pair of read and write, alternating current, selection switches 20 and 21 for each plane of matrix 13. The switches of each pair couple the outputs of a read generator 22 and a write generator 23 to the primary matrix 16 of the selected plane of secondary matrix 13. Details of a switch that is suitable for use as alternating current switches 20 and 21 are shown in FIG. 7. Program signals on program circuit P select one pair of the switches 20 and 21 for operation in a well known manner and thereby establish a conductive circuit to a selected primary matrix 16 from both the read generator 22 and the write generator 23.

The generators are operated in alternation in response to clock signals in circuit C from a clock source 26 during the read and write intervals of the memory array. Circuit C is also a cable with individual timing leads dropped out at appropriate circuit points. Clock source 26 is shown within program control 18 thereby indicating schematically a typical memory system control wherein random program signals in the various circuits P are in synchronism with regularly occurring clock pulses from source 26. Clock signals from source 26 are also applied to precharge circuits 27 that are associated with column matrix 17 in all planes in accordance with the present invention for precharging spurious capacitances associated with crosspoint loads in the column circuits of secondary matrix 13 as will subsequently be described in greater detail.

Drive current is coupled from one of the generators 22 or 23, through plane selection matrix 19, row primary matrix 16, a program-selected one of the switches 14, and back to the grounded terminal of the generator. Within matrix 16, the aforementioned drive current causes a drive signal to be inductively coupled to secondary matrix 13 wherein the signal activates a crosspoint load in a column selected by one of the switches 15. The matrix crosspoint circuit defined by the selected row and column of matrix 13 is an X selection drive circuit of a row of magnetic storage elements in a module 10. In a similar manner the Y access circuit 12 operates to select a column of module 10 and thereby actuates the storage element at the intersection of that row and column.

Figure 2A:
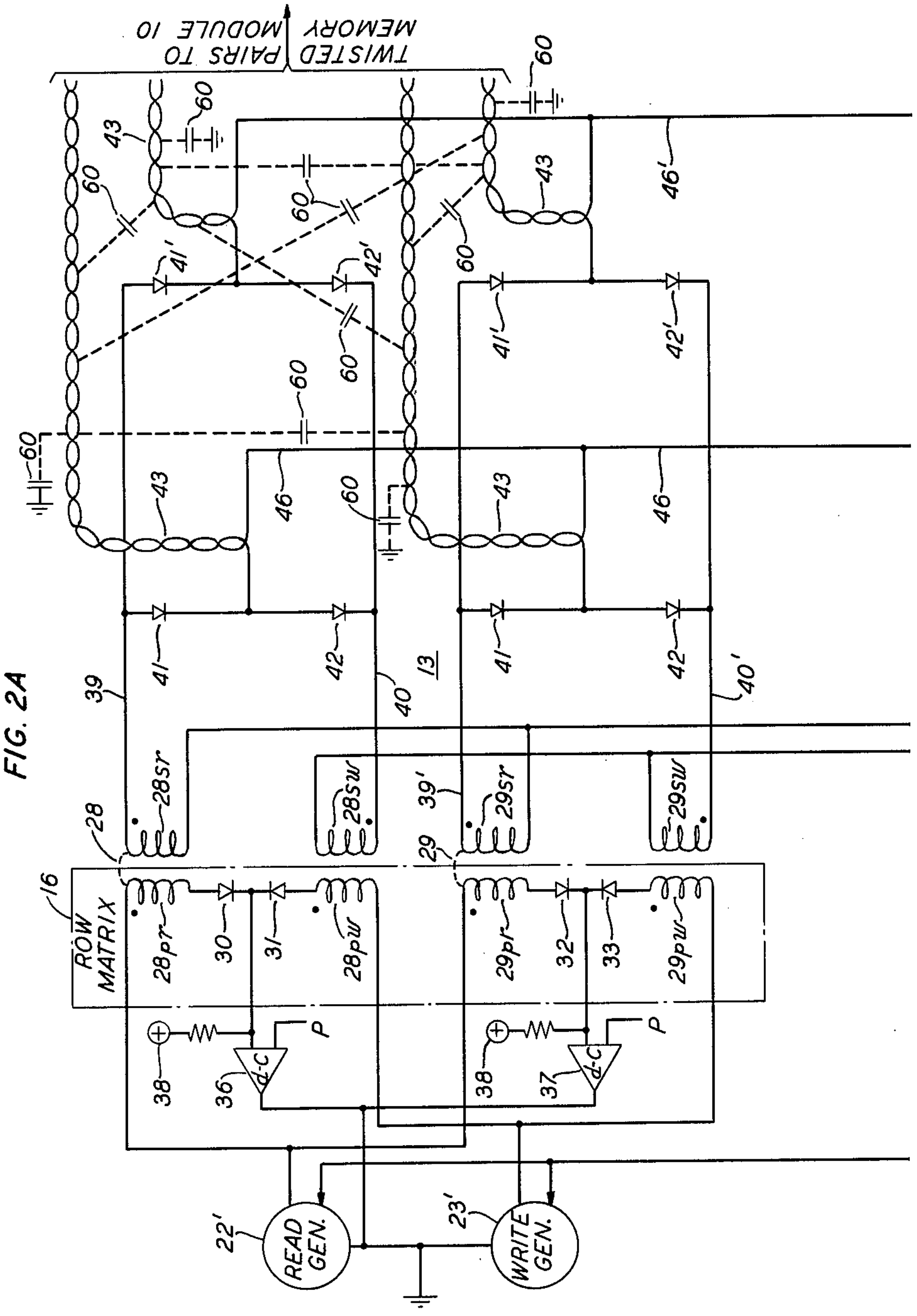
FIGS. 2A and 2B are together a schematic diagram of a portion of the system of FIG. 1 and illustrate the circuit details of the invention as applied to the system of FIG. 1.
Figure 2B:
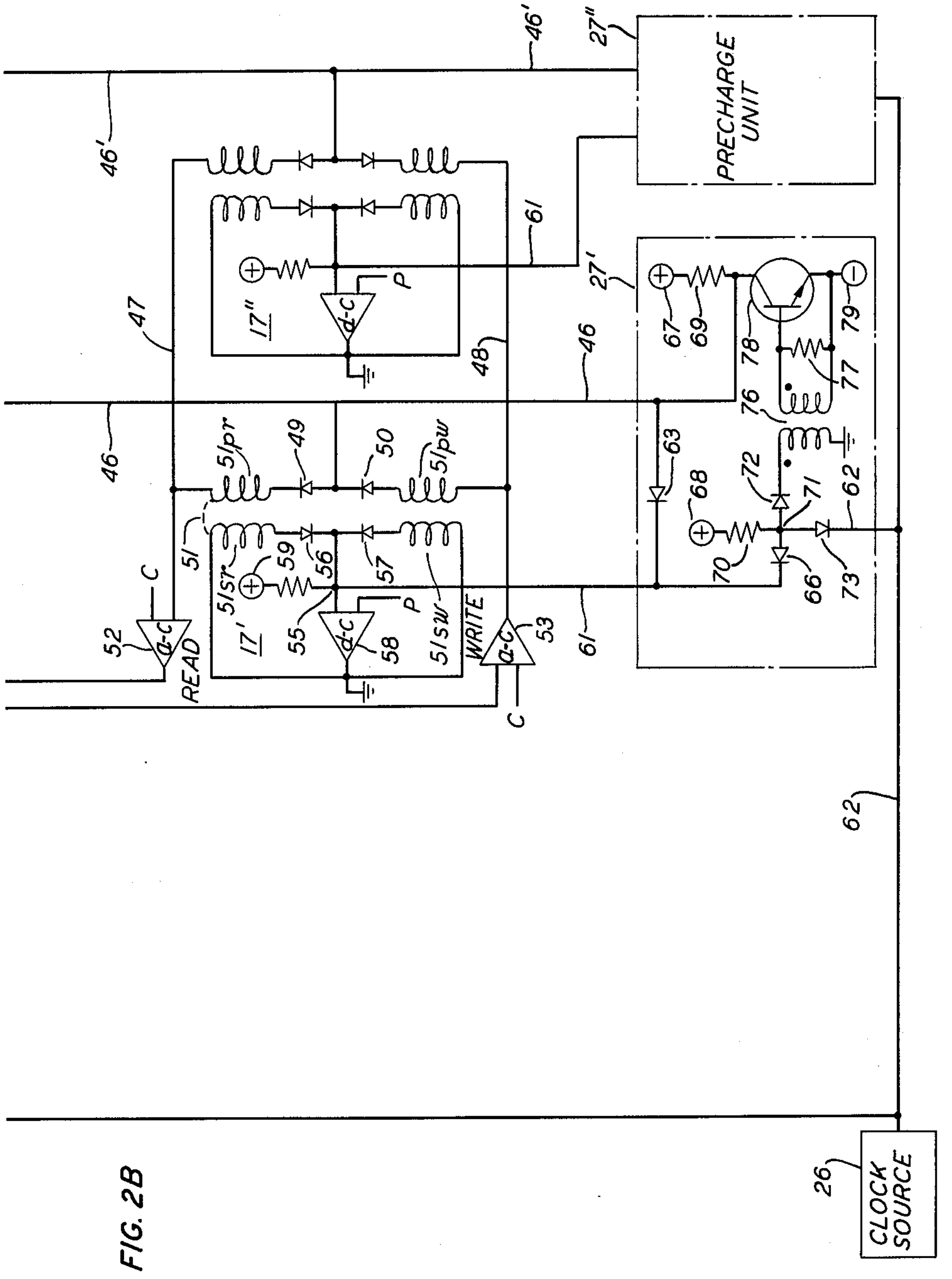

FIGS. 2A and 2B show the essential details of a single plane of a secondary matrix 13, including the associated row matrix 16, column matrix 17, and precharge circuits 27. A composite schematic diagram is formed by placing the bottom edge of FIG. 2A adjacent to the top edge of FIG. 2B. Correspondence between the structures of FIG. 1 and FIGS. 2A and 2B is indicated by the use in FIGS. 2A and 2B of reference characters which are the same as, or similar to, those employed in FIG. 1. In order to simplify the drawing, the plane selection matrix 19 has been omitted and is in FIG. 2A considered to be included within the read generator 22' and write generator 23'. These generators drive primary matrix 16, and the output of each generator is branched to connect to primary windings of coupling transformers therein. Only two such transformers, 28 and 29, are shown in FIG. 2A in order to illustrate operation of the invention, without unnecessary complication of the drawing, but larger numbers of transformers for larger matrices can be employed in the same manner.

Figure 8:
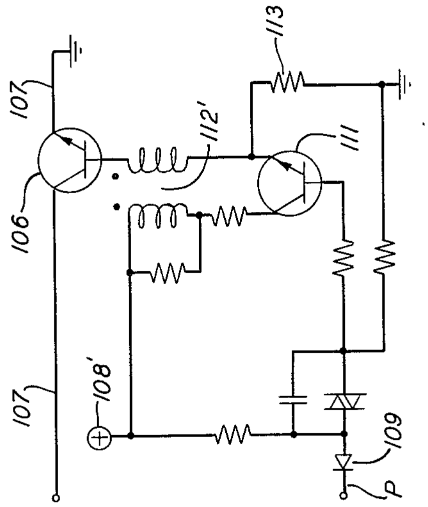
FIGS. 7 and 8 are schematic diagrams of programmed switches used in FIGS. 2A and 2B, and FIGS. 7A and 8A are schematic representations of those switches, respectively.

The output of read generator 22' is connected to one terminal of each of the read primary windings 28*pr* and 29*pr* while the output of write generator 23' is connected to primary windings 28*pw* and 29*pw*. The remaining terminals of the aforementioned primary windings are connected together by a pair of oppositely poled diodes 30 and 31 in transformer 28, and 32 and 33 in transformer 29. The midpoint of each diode pair is connected to one input of one of the programmed switches 36 or 37 which may be selected for operation by signals on program circuit P to connect such diode pairs to ground for selecting a row of the matrix. Each of the switches 36 and 37 has associated with its diode input a source 38 of positive potential for reversely biasing the associated diode pair in the absence of a program signal which opens the corresponding switch. FIG. 8 illustrates a programmed switch that may be employed for switches 36 and 37. This type of switch is the subject of a copending application Serial No. 237,929, filed November 15, 1962, of P. A. Harding and G. L. Vandermolen, which is entitled "High Speed Transistor Switching Circuit."

Switches 36 and 37 are included in the switches 14 of FIG. 1 and each serves the same row circuit in all planes of row matrix 16. Thus, in order to expand the number of access matrix planes, relatively inexpensive transformers and diodes are added; and all are served by a single set of relatively expensive switches 14.

Sources 38 in FIG. 2A are schematically indicated by circled plus signs which represent a connection to the positive terminal of a suitable source of direct potential which has the negative terminal thereof connected to ground. This same schematic representation is utilized for other potential sources included in the drawings, and the polarity sign within the circle indicates the polarity of the particular source terminal to which the circuit is connected.

Figures 5, 6:
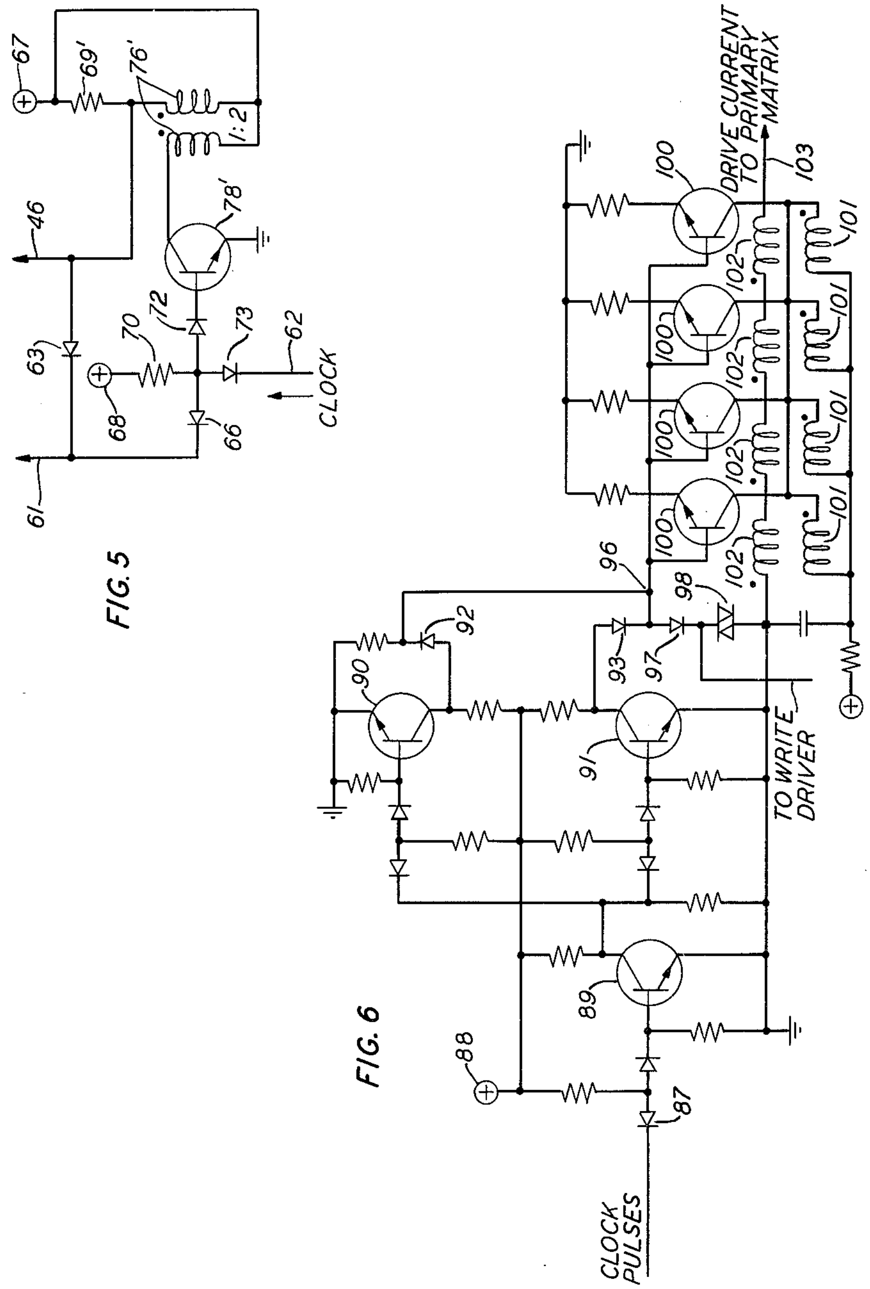
FIG. 5 is a schematic diagram of a modified precharge circuit for use in the system as illustrated in FIGS. 1, 2A, and 2B.
FIG. 6 is a schematic diagram of a particular amplifier and driver circuit that may be used in the circuit of FIG. 1.

If it is assumed that switch 36 is closed by a program signal from circuit P, current from read generator 22' flows through winding 28*pr*, the diode 30, switch 36, and back to the ground terminal of generator 22'. Similarly, current from write generator 23' flows in a loop including transformer 28*pw* and switch 36. Read and write currents normally flow during noncoincident time intervals defined by clock source 26, and diodes 30 and 31 prevent interference between the read and write primary windings of transformer 28 when cooperative current drivers of the type indicated in FIG. 6 are employed.

Transformer 28 is an intermatrix transformer that has secondary windings 28*sr* and 28*sw* which are connected to a read bus 39 and a write bus 40 in one row of the secondary matrix 13. At each crosspoint in that row of the matrix, the read and write buses 39 and 40 are interconnected by a pair of diodes 41 and 42 which are similarly poled with respect to the connection between the buses but which are oppositely poled with respect to a crosspoint load circuit 43 that is connected to the common terminal between the two diodes 41 and 42. The other terminal of the crosspoint load 43 is connected to a column wire 46 that is common to all of the crosspoint loads in the same column of matrix 13. Each of the crosspoint loads 43 in the embodiment described herein comprises a twisted wire pair which is one of the X selection circuits driving X inputs of the magnetic memory module 10 in FIG. 1. Only two rows and two columns of matrix 13 are illustrated in FIG. 2 since this is all that is necessary to demonstrate the structure and operation of the precharge circuit 27. However, the secondary matrix, utilizing the present invention, may be expanded to any desired dimension by utilizing the principles discussed herein. Row buses 39′ and 40′ are similarly connected to all of the crosspoints 43 in the matrix row which is driven by the intermatrix transformer 29. Likewise, column wire 46′ is connected to a terminal of all of the crosspoint loads 43 which are common to its column of the matrix 13.

Each of the column wires of matrix 13 comprises in its column a common return circuit for both the read and the write secondary windings of the transformers 28 and 29. Column wire 46 is coupled in FIG. 2B to a read return bus 47 and a write return bus 48 by a pair of oppositely poled diodes 49 and 50, and by the primary windings 51*pr* and 51*pw* of a further intermatrix transformer 51. It will be noted that although diodes 49 and 50 are oppositely poled with respect to column wire 46, they are similarly poled in their connection with the primary windings of transformer 51 between the return buses 47 and 48. Return bus 47 is coupled by a read clocked switch 52 to the remaining terminals of the read secondary windings of intermatrix transformers 28 and 29. In like manner, a write clocked selector switch 53 couples the terminals of the write secondary windings of transformers 28 and 29 to the write return bus 48. Column 46′ is similarly connected to the return buses 47 and 48. Switches 52 and 53 are of the type illustrated in FIG. 7 with clock signals, instead of program signals, applied to the program input.

For drawing convenience, the column primary matrix 17 is shown in FIG. 2B as comprising a plurality of units 17′ and 17″. These units are similar to one another and are provided for coupling program signals to select a particular matrix column of the secondary matrix 13. Unit 17′ includes secondary windings 51*sr* and 51*sw* connected in a closed loop circuit with a pair of oppositely poled diodes 56 and 57. These diodes are, however, similarly poled with respect to an input connection of a programmed selector switch 58 of the type shown in FIG. 8, which may be opened by program signals to connect the diodes to the grounded terminals of windings 51*sr* and 51*sw*. A positive potential source 59 is coupled to the same input of switch 58 for reversely biasing diodes 56 and 57 in the absence of a program signal directing selection of column wire 46. Switch 58 is for convenience shown within unit 17′, but it is actually one of the common column switches 15 and serves the column wires 46 in all planes of the X access circuit 11.

When program signals close switch 36 in FIG. 2A and switch 58 in FIG. 2B, and when clock signals actuate read switch 52 and read generator 22′, current is driven through primary winding 28*pr* and causes a positive pulse to appear across winding 28*sr* to drive a loop current through bus 39, diode 41, a crosspoint load 43, column wire 46, diode 49, winding 51*pr*, switch 52, and back to winding 28*sr*. Similarly, when clock signals actuate write generator 23′ and switch 53, a drive current is driven through a similar loop including diode 42, the same crosspoint load 43, column wire 46, and diode 50. When switch 36 is not selected, no drive currents, either read or write, can be coupled to the corresponding row of matrix 13; and similarly, when switch 58 is not selected the diodes 56 and 57 present a high impedance in their loop circuits and this impedance is reflected back into the associated primary windings for preventing current flow therein from the column wire 46.

It will be noted in FIG. 2A that all of the crosspoint loads 43 are interconnected with one another and to ground by spurious, leakage capacitances within module 10 which are schematically represented in the drawing as lumped capacitors 60 connected by broken-line leads to the cross-point loads 43 and to ground. These capacitors tend to dissipate drive currents applied to row buses of the matrix and thereby increase the matrix operating time. Considering so much of the circuit as has been described at this point, a positive read pulse on read bus 39 tends to forward bias the diodes 41 and 41′ in that row of matrix 13. Since only one column, e.g., column 46, is selected for operation at one time, it is desired that substantially all of the drive current should flow through diode 41 and column wire 46. However, the spurious capacitances associated with column wire 46′ are also coupled to read bus 39 by diode 41′ and must be charged to the drive potential before the peak value of that potential can be developed in the crosspoint load that is associated with diode 41 and column 46. Consequently, and disregarding for a moment the precharge circuits 27, a significant portion of the drive energy would be diverted from the selected crosspoint load in the selected row and column, and a significant amount of time would be required to accomplish the charging of the capacitors 60.

In order to alleviate the speed-reducing and energy-dissipating effects of capacitors 60, precharge circuits 27′ and 27″ in FIG. 2B are connected to column wires 46 and 46′, respectively, for precharging the capacitors 60 that are associated with a nonselected column wire during a time interval immediately preceding a read or write interval. Each precharge circuit is an AND-NOT type of logic circuit wherein the various permutations of input signals on leads 61 and 62 operate the logic and produce on the logic circuit output, i.e., on the associated column wire one of three different voltage conditions as a function of the permutations of these input signals. Further in accordance with the invention, the arrangement of precharge circuits 27 to cooperate with common row and column switches 14 and 15, and plane matrix 19 permits a single set of the circuits 27 to serve the column wires of all planes in access circuit 11.

Since the circuits 27′ and 27″ are identical, only one is illustrated in detail and need be described. In the precharge circuit 27′, lead 61 couples voltage changes at terminal 55 in the column matrix unit 17′ to one input of the precharge circuit. A lead 62 couples the output of clock source 26 to another input of precharge circuit 27′. If a program signal closes switch 58 in column matrix unit 17′ to clamp terminal 55 to ground, two diodes 63 and 66 in precharge circuit 27′ are biased into conduction under the influence of the associated positive potential sources 67 and 68 which are connected thereto through resistors 69 and 70. Since column wire 46 is connected to the anode of diode 63 at the junction point between that diode and resistor 69, this column wire is clamped to a potential which is slightly above ground potential, but which is for convenience herein referred to as ground potential. A similar potential condition exists at the common junction 71 of resistor 70 and diode 66, and this condition inhibits conduction from source 68 through diode 72 which also has its anode connected to that junction. Diode 73 may or may not conduct to clock source 26, but this is immaterial with respect to the precharge circuit.

Figure 4:
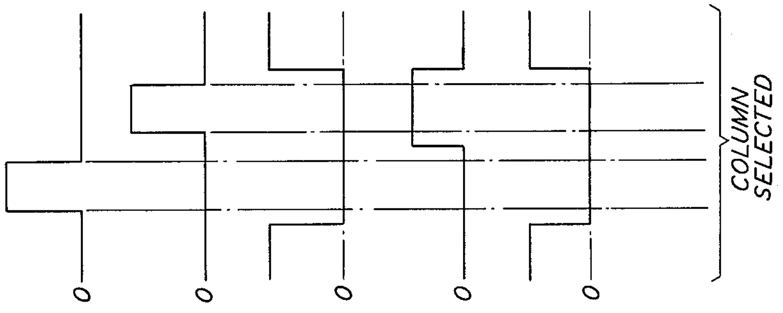
FIGS. 3 and 4 are timing diagrams illustrating the operation of the invention.

The cathode of diode 73 is connected to the aforementioned input lead 62 from clock source 26. Accordingly, clock source 26 is unable to alter the potential level of junction 71 as long as the program signal maintains switch 58 closed. Similarly, no substantial current flows through diode 72. The conditions just described are indicated in the timing diagram of FIG. 4 for the situation wherein a column is selected for operation. The program signal holds switch 58 operated and terminal 55 at ground during both the read and the write current driver pulses and maintains ground potential on the column wire 46 during that time even though a clock signal is received from source 26 during the write portion of that interval.

Figure 3:
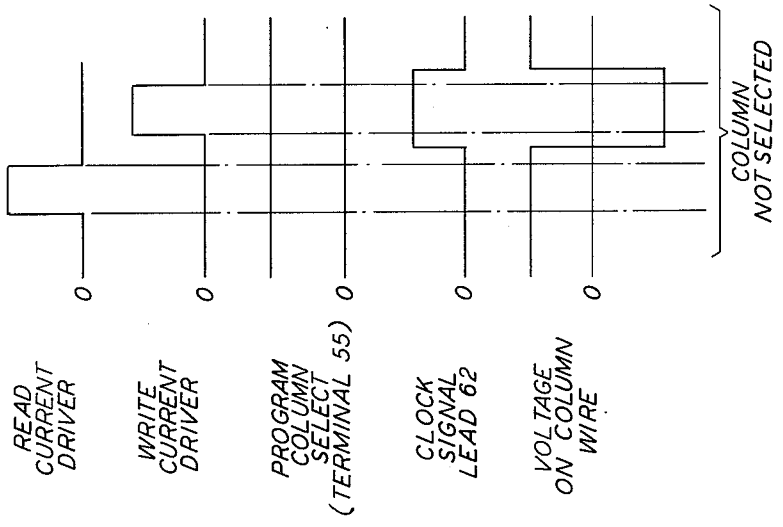

FIG. 3 illustrates the conditions which prevail when column wire 46 is not selected for actuation. In this case the program column select signal is absent, and the voltage on the input lead 61 is positive. The switch 58 is held open, and the positive potential of source 59 is coupled through lead 61 to reversely bias diodes 63 and 66. In the absence of a clock signal during the read current driving interval, lead 62 is at ground; and diode 73 conducts to clamp terminal 71 at ground. Here again, there is substantially no conduction through diode 72; consequently wire 46 is biased to the positive potential of source 67; and current flows from that source through resistor 69 and wire 46 to place a positive charge on those capacitors 60 which are conductively coupled to column wire 46. This positive bias on column wire 46 and the positive charge developed on capacitors 60 reversely bias the diodes 41 which are connected through crosspoint loads to column wire 46. Accordingly, read drive signals are isolated from the nonselected column wire 46, and substantially the entire energy thereof is directed to column wire 46' which may be selected at that time.

During the write current driving pulse the diodes 41 and 41' are out of the picture, and one of the oppositely poled diodes 42 and 42' is forward biased by the negative pulse on a write current bus of the selected row. However, just prior to the beginning of the write current pulse, and after the end of the read current pulse, a clock pulse applies a positive voltage to lead 62 for reversely biasing diode 73. Continuing the assumption that column 46 is a nonselected column in matrix 13, diodes 63 and 66 are also reversely biased. The source 68 can now drive a current through diode 72 and the primary winding of a coupling tranformer 76 to develop a positive potential difference across a resistor 77 for forwardly biasing the base-emitter circuit of a transistor 78. This action interconnects source 67 with a negative source 79 and draws sufficient current through resistor 69 to pull column wire 46 down to a negative potential. That negative potential removes the positive charge on capacitors 60 and places a negative charge thereon so that the write bus diodes 42 associated with nonselected column wire 46 are reversely biased. This action isolates column wire 46 and its associated crosspoint loads from the write buses of matrix 13. The time constant of transformer 76 and associated circuit elements is adequate to maintain transistor 78 fully conductive during the clock pulse interval.

In summary with respect to FIGS. 2A, 2B, 3, and 4, it can be seen that when a column wire such as the wire 46 is not selected for operation by program signals, it is positively biased during the read current drive pulses and negatively biased during the write current drive pulses. These conditions reversely bias diodes 41 and 42 during the appropriate row drive intervals, respectively, to isolate column wire 46 and its connected crosspoint loads from the read and write buses in all rows of matrix 13. However, when column wire 46 is selected by the program signals for operation in the memory access function, the wire is clamped substantially at ground potential so that currents may flow therethrough with either read or write polarity from the matrix row which is also selected by the program signals. Similar operation in accordance with FIGS. 3 and 4 characterizes the precharge circuits associated with all column wires that may be included in access matrix 13, and normally only one column and one row of any one plane will be selected by the program control 18 in FIG. 1 for simultaneous actuation during a particular read-write cycle. Only one read-write cycle is shown in each of the FIGS. 3 and 4. For any particular column wire in FIG. 2A, read-write cycles as shown in either FIG. 3 or FIG. 4 may follow one another in any order and at any rate up to the limit of the memory array depending upon the demands upon the memory at any particular time.

In FIG. 5 there is shown a modification of a current precharge circuit, such as circuit 27' of FIG. 2, which may be employed in a similar manner. In this case, however, the transformer and transistor are interchanged and the single positive potential source 67 is further connected in circuit with the primary and secondary windings of transformer 76'. The secondary winding of that transformer is connected in parallel with resistor 69' between source 67 and column wire 46. Now when column wire 46 is not selected, the positive potential on lead 61 blocks diodes 63 and 66. When the clock pulse appears during the write interval its positive potential blocks diode 73 thereby permitting a drive current to flow from source 68 through resistor 70 and diode 72 into the base electrode of transistor 78'. The transistor is biased into conduction, and a large negative voltage is developed across the primary winding of transformer 76'. This negative voltage, which is stepped up by a factor of two in transformer 76', is coupled to the secondary winding and opposes source 67 to pull column wire 46 to a negative voltage with respect to ground in the same manner illustrated in FIG. 3.

In the absence of a program signal and a clock signal, column wire 46 is positively biased to the potential of source 67, and current flows until capacitors 60 associated with wire 46 are fully charged. Upon the occurrence of a clock signal, transistor 78' is driven into conduction as previously described to bias wire 46 negatively. When a program signal selects column wire 46 for operation, diode 63 clamps the wire at ground potential as previously described and draws current from source 67. The advantage of this embodiment is that there is no longer a need for the transistor 78' to handle the large switching voltage that is across the transistor 78 in FIG. 2B, and there is no need for the negative source 79.

In FIG. 6 there is shown a schematic diagram of a current driver which may be used for the generators 22 and 23 in FIG. 1. The driver circuit is described in detail in a copending application Serial No. 241,684, filed December 3, 1962, entitled "Current Drive Circuit" which is being filed concurrently herewith in the names of P. A. Harding and E. H. Siegel, Jr. Clock pulses from source 26 are applied to the cathode electrode of a diode 87 thereby blocking the diode and permitting positive potential from a source 88 to drive a transistor 89 into conduction. The negative-going voltage thereby developed at the collector electrode of transistor 89 is coupled in multiple to the input gates of two amplifier transistors 90 and 91 which are arranged respectively in the common emitter configuration. These negative-going signals reduce conduction in transistors 90 and 91 thereby developing positive-going voltages at their collector electrodes. Those collector electrodes are connected, respectively, through diodes 92 and 93 to a common junction 96 that is in turn connected to ground through a diode 97 and a varistor 98. This amplifier arrangement produces a large positive-going pulse at junction 96 during each clock pulse, and the magnitude of such pulses is regulated by the varistor 98 to hold a uniform potential at junction 96.

The pulse at junction 96 drives four parallel-connected amplifier transistors 100 into conduction thereby developing across each of the transformer primary windings 101 a potential difference which is negative at the collector electrode of the corresponding transistor 100. The series-connected secondary windings 102, corresponding to each of the primary windings 101, are wound so that the negative voltage coupled from the windings 101 develops a positive voltage at each of the terminals of the windings 102 which is remote from ground. Accordingly, a large positive pulse is developed at the output lead 103 which corresponds to the output lead from one of the generators 22 or 23 to the plane primary matrix 16 in FIG. 1.

Two generators of the type described in connection with FIG. 6 would be provided for generators 22 and 23. These two would share as a common circuit branch the varistor 98. Also each of the transformers comprising a primary winding 101 and a secondary winding 102 would be wound on the same core with the corresponding windings of the other generator. This transformer arrangement permits the output pulse of each generator to be coupled to the output of the other generator with reversed polarity for controlling the isolating diodes, e.g., 30 and 31, in FIG. 2A as previously mentioned. These features and others are described in greater detail in the last-mentioned Harding et al. application.

In FIG. 7 there is shown an alternating current switch which may be used for programmed switches 20 and 21 in FIG. 1 as previously noted. A transistor 106 has its collector-emitter circuit included in series in a circuit lead 107 to switch the current therein on or off. Conduction of transistor 106 is controlled by program or clock signals on circuit P which cooperate with a source 108 to control gating diodes 109 and 110. Circuit P may comprise plural leads connected to a plurality of diodes 109 as an AND gate if more than one control function is to be effective.

Figure 7A:
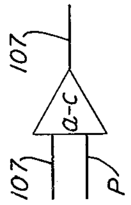

A positive program signal blocks diode 109 and source 108 causes a transistor 111 to be biased into conduction. A transformer 112 responds to collector current flow in transistor 111 and biases transistor 106 for conduction. This action establishes continuity in circuit lead 107. FIG. 7A illustrates the schematic symbol representing FIG. 7 in other figures of the drawing. This switch can operate in pulse fashion only because its transistor 106 depends upon changing current in transformer 112 for base-emitter bias.

Figure 8A:
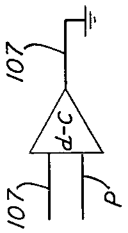

FIG. 8 illustrates a direct current switch which may also be used in other figures of the drawings and may be represented by the symbol shown in FIG. 8A. The details of the switch in FIG. 8 are disclosed and claimed in the aforementioned copending application of P. A. Harding and G. L. Vandermolen. In this case transformer 112′ is connected to give the circuit a regenerative function in cooperation with emitter resistor 113. Conduction changes in the collector electrode of transistor 111 are coupled by transformer 112′ to drive the base circuit of transistor 106 harder in the same direction as such changes. Likewise emitter current from transistor 106 returns to the base through lead 107, ground, resistor 113, and transformer 112′. Potential differences developed across resistor 113 by such return current tend to drive transistor 111 harder. This switch cam continue to conduct for as long as appropriate input signal is present.

Although the invention has been described in connection with particular applications and embodiments thereof it is to be understood that further applications and modifications which will be obvious to those skilled in the art are included within the spirit and scope of the invention.

What is claimed is:

1. In a matrix selection circuit wherein crosspoint loads are arranged to interconnect matrix row and column circuits, means applying control signals in coincidence to a selected one of said row circuits and a selected one of said column circuits for energizing the one of said loads interconnecting said selected row and column circuits with different polarities at different times, separate means connected to each of said column circuits to bias each of said column circuits to a polarity corresponding to the polarity of the energization of said one load and in coincidence with said control signals, and means disabling the bias means of said selected column circuit in response to said control signals applied to said selected column circuit.

2. In a matrix selection circuit wherein cross point loads are arranged in interconnected row and column circuits to be selectively actuated by signals coupled from a program control signal source to one row and one column at a time, and wherein spurious capacitances comprise leakage paths for said signals among said loads and between said loads and ground, the improvement which comprises separate means connected to each of said column circuits to charge all of said capacitances to the same polarity as said control source signals applied to any one of said row circuits, means receiving said program control signals and actuating such column circuit in response thereto, and means connected to said receiving means and said column circuit for discharging those spurious capacitances coupled to load circuits associated with said one column circuit.

3. A circuit for charging leakage capacitances in a switching matrix having crosspoint loads interconnected in row and column circuits and wherein said leakage capacitances couple said loads to one another, said matrix including a different diode connected between each load and each matrix row circuit to which the load is connected, said charging circuit comprising closable switching means connected to each column circuit of said matrix for activating that column circuit, a source of control signals activating one of said row circuits and one of said switching means at the same time, means applying predetermined potentials to each of said column circuits for charging said capacitances to potentials that reversely bias said diodes connected through loads to such column circuit, and means responsive to the closing of said switching means in one column circuit disabling said potential applying means for that column to discharge leakage capacitances coupled thereto.

4. A matrix switching circuit having interconnected rows and columns defining a plurality of crosspoints and having a circuit load at each matrix crosspoint and having spurious capacitive coupling among said circuit loads, said switching circuit comprising for each row thereof a read bus, a write bus, and a different pair of oppositely poled diodes connecting one terminal of each load of such row to said buses, respectively, a separate column wire connected to the other terminal of all of said loads in each matrix column, a read return circuit connected to the read buses of all rows of said matrix, a write return circuit connected to the write buses of all rows of said matrix, a different pair of oppositely poled diodes connecting each of said column wires to both of said return circuits, a source of clock signals, a source of program signals, a plurality of AND-NOT logic gates each connected at its output to one of said column wires and having two input connections, means applying said program signals to one of said input connections of one of said gates at a time, and means applying said clock signals to the other of said input connections of all of said gates at the same time for biasing such column wire to a voltage of the same polarity as a selected one of said read buses in response to a clock signal only, or to a voltage of the same polarity as a selected one of said write buses in the absence of both clock and program signals, or to an intermediate voltage condition in response to any other permutation of said clock and program signals.

5. The matrix switching circuit in accordance with claim 4 in which said source of program signals comprises means applying read and write drive pulses of opposite polarity to said read and write buses, respectively, during different spaced time intervals, and said clock signal applying means applies clock signals which are initiated during the time space between said read and write pulses and terminate after the end of a write pulse.

6. A matrix selection switch circuit having plural intersecting row and column circuits and comprising a load at each crosspoint thereof which is defined by the intersection of a row and a column of the matrix, each of said loads having one terminal connected to a row circuit which is common to a first plurality of said loads and a second terminal connected to a column circuit which is common to a second plurality of said loads including one load of said first plurality, program control means supplying signals for selecting one row circuit and one column circuit for actuation in at least partially over-lapping time slots, a source of clock signals, a separate logic circuit connected to each of said column circuits and having one input responsive to outputs of said program control means and another input responsive to said source for biasing such column circuit to a first voltage condition in the absence of both program and clock signals and to a second voltage condition in response to a clock signal in the absence of a program signal, and said logic circuit further including means biasing such column circuit to a third voltage condition in response to a program control signal.

7. The matrix circuit in accordance with claim 6 in which each said logic circuit comprises a diode directly connected between the program control input and the column circuit output of said logic circuit for clamping said column circuit at substantially ground potential in response to a signal from said program control, AND diode logic means connected to produce an output voltage in response to the simultaneous absence of a program control signal and the presence of a clock signal, potential producing means, a transistor connected to be biased for conduction by said output voltage, and means coupling an electrode of said transistor to said column circuit and said potential producing means for biasing said column circuit to one polarity of voltage when said transistor is conducting and to a second polarity of voltage when said transistor is nonconducting.

8. The matrix circuit in accordance with claim 7 in which said transistor has base, emitter, and collector electrodes, a transformer couples the output of said AND diode logic to the base electrode of said transistor, said potential producing means includes positive and negative potential sources, ad a resistor connected in series with the collector and emitter electrodes of said transistor between said sources, and said coupling means comprises a connection between said collector electrode and said column circuit.

9. The matrix circuit in accordance with claim 7 in which said transistor has base, emitter, and collector electrodes, the output of said AND diode logic means is connected to the base electrode of said transistor, and said potential producing means comprises a transformer having primary and secondary windings, one terminal of said primary winding being connected to said collector electrode, a source of potential connected between said emitter electrode and another terminal of said primary winding, said secondary winding being connected between the last-mentioned terminal and said column circuit to bias said column circuit to a negative potential when said transistor is conducting.

10. In a matrix selection circuit a plurality of row and column circuits arranged in coordinate planar arrays to define, in each of a plurality of planes, matrix crosspoints at intersections of row and column circuits, a plurality of crosspoint load circuits each interconnecting a row and a column circuit at an intersection thereof, said load circuits being further interconnected with one another by spurious capacitances, a source of control signals, a first plurality of switches connected to couple control signals from said source to one of said planes at a time, a second plurality of switches, each of which is connected to couple control signals from said source to a different row circuit in one of said planes and to the corresponding row circuit in all other of said planes, a third plurality of switches, each of which is connected to couple control signals from said source to a different column circuit in one of said planes and to the corresponding column circuit in all other of said planes, a source of clock signals, a plurality of logic circuits, each having an output connection to a different column circuit in one of said planes and to the corresponding column circuit in all other of said planes, each of said logic circuits also having a first input connection to one of said third plurality of switches and a second input connection to said clock signal source, and each of said logic circuits including means biasing all column circuits connected to its output to a reference potential for discharging said capacitances in response to actuation of the switch connected to its first input and including further means biasing all column circuits connected to its output to a higher or lower potential for charging said capacitances in response to the presence or absence of a signal at its second input from said clock source in the absence of a signal at its first input.

11. In a matrix selection circuit, a plurality of row and column circuits arranged in coordinate planar arrays to define, in each of a plurality of planes, matrix crosspoints at intersections of row and column circuits, a plurality of crosspoint load circuits each interconnecting a row and a column circuit at an intersection thereof, said load circuits being further interconnected with one another by spurious capacitances,
a source of selection signals,
a source of drive signals,
a first plurality of switches responsive to said selection signals and coupling said drive signals to one of said planes at a time,
a second plurality of switches each of which is responsive to said selection signals and is connected to couple said drive signals to a different row circuit in one of said planes and to the corresponding row circuit in all other of said planes,
a third plurality of switches each of which is responsive to said selection signals for coupling said drive signals between a different column circuit and all row circuits of one of said planes and between the corresponding column circuit and all row circuits in all other of said planes, and
means biasing all column circuits except said different column circuit and its said corresponding column circuits to the same voltage polarity as said drive signals in said different row circuit.

12. In a matrix selection circuit,
a plurality of row and column circuits arranged in coordinate planar arrays to define, in each of a plurality of planes, matrix crosspoints at intersections of row and column circuits,
a plurality of crosspoint load circuits each interconnecting a row and a column circuit at an intersection thereof, said load circuits being further interconnected with one another by spurious capacitances,
a source of selection signals,
a signal source providing drive signals to said matrix selection circuit and having a ground return path therefrom,
a first plurality of switches responsive to said selection signals and coupling said drive signals to all row circuits of one of said planes at a time,
a second plurality of switches each of which is responsive to said selection signals for connecting to said ground return path a different one of said row circuits of one of said planes and corresponding row circuits in all of said planes,
a third plurality of switches each of which is responsive to said selection signals and is connected to establish a drive signal coupling between a different column circuit of one of said planes and all row circuits in the plane selected by said first plurality of switches, each such switch also establishing a similar coupling for the corresponding column circuit and all row circuits in each other of said planes, and
means biasing all but said different column circuit and its corresponding column circuits to the same polarity as said drive signals in said different row circuit.

References Cited by the Examiner

UNITED STATES PATENTS

| | | | |
|---|---|---|---|
| 2,947,977 | 8/60 | Bloch | 340—166 XR |
| 3,054,985 | 9/62 | Mason | 340—166 |

NEIL C. READ, *Primary Examiner.*